(12) United States Patent
Bothmann et al.

(10) Patent No.: US 11,654,544 B2
(45) Date of Patent: May 23, 2023

(54) INSERT FOR A POWER TOOL HOUSING

(71) Applicant: Snap-on Incorporated, Kenosha, WI (US)

(72) Inventors: Richard Bothmann, Round Lake, IL (US); Brian C. King, Oak Creek, WI (US); Ray Kinsley, Mount Pleasant, WI (US)

(73) Assignee: Snap-on Incorporated, Kenosha, WI (US)

( * ) Notice: Subject to any disclaimer, the term of this patent is extended or adjusted under 35 U.S.C. 154(b) by 179 days.

(21) Appl. No.: 16/891,826

(22) Filed: Jun. 3, 2020

(65) Prior Publication Data

US 2021/0379750 A1    Dec. 9, 2021

(51) Int. Cl.
  *B25F 5/02* (2006.01)
  *F16B 43/00* (2006.01)

(52) U.S. Cl.
  CPC .............. *B25F 5/02* (2013.01); *F16B 43/001* (2013.01)

(58) Field of Classification Search
  CPC ................................. B25F 5/02; F16B 43/001
  See application file for complete search history.

(56) References Cited

U.S. PATENT DOCUMENTS

| | | | |
|---|---|---|---|
| 1,922,258 A | 8/1922 | Packer | |
| 3,357,275 A | 12/1967 | Green et al. | |
| 3,908,139 A * | 9/1975 | Duncan, Jr. | B25F 5/02 310/43 |
| 4,125,140 A * | 11/1978 | Basile | B64C 1/14 411/105 |
| 4,306,708 A * | 12/1981 | Gassaway | F24F 1/10 248/635 |
| 4,309,123 A * | 1/1982 | Moore | F16B 43/00 29/467 |
| 4,730,134 A * | 3/1988 | Sistare | B23B 45/001 310/91 |
| 5,407,381 A * | 4/1995 | Schaefer | B24B 23/028 451/344 |
| 5,879,115 A | 3/1999 | Medal | |
| 6,047,780 A * | 4/2000 | Lin | B25B 21/00 173/221 |

(Continued)

FOREIGN PATENT DOCUMENTS

CN   203978668       12/2014
CN   203978668 U  *  12/2014

(Continued)

OTHER PUBLICATIONS

Australian Examination Report No. 1 for corresponding AU Application No. 2021203215, dated Dec. 23, 2021, 5 pages.

(Continued)

*Primary Examiner* — Nathaniel C Chukwurah
*Assistant Examiner* — Lucas E. A. Palmer
(74) *Attorney, Agent, or Firm* — Seyfarth Shaw LLP

(57) ABSTRACT

Inserts disposed in a housing of a pneumatically or hydraulically powered tool having a motor adapted to rotate a drive lug in either of first and second rotational directions. The insert is composed of a material resistive to creep and/or stress relaxation. The insert contacts fasteners applying a clamping force to the tool and remove the housing from the load path of the clamping force, thereby reducing the possibility of fluid leaks.

16 Claims, 5 Drawing Sheets

(56) References Cited

U.S. PATENT DOCUMENTS

| | | | |
|---|---|---|---|
| 6,280,132 B1* | 8/2001 | Szczukowski | F16B 5/0258 411/107 |
| 6,719,067 B2 | 4/2004 | Taga | |
| 7,040,414 B1* | 5/2006 | Kuo | F01C 20/08 173/218 |
| 7,174,971 B1* | 2/2007 | Chen | B23B 45/044 173/104 |
| 7,438,140 B2* | 10/2008 | Sterling | B25B 21/02 173/104 |
| 7,455,122 B2* | 11/2008 | Chen | B25B 21/02 173/104 |
| 7,458,429 B2* | 12/2008 | Chen | B25B 21/02 173/104 |
| 7,699,571 B2* | 4/2010 | Booher | F16B 43/00 411/546 |
| 7,708,512 B2* | 5/2010 | McLean | F16B 5/025 411/533 |
| 8,789,404 B2 | 7/2014 | Taylor et al. | |
| 9,278,443 B2* | 3/2016 | Robson | B25D 17/24 |
| 9,382,930 B2 | 7/2016 | Taylor et al. | |
| 10,550,876 B2* | 2/2020 | Slater | F16B 41/002 |
| 2003/0230423 A1* | 12/2003 | Izumisawa | B25B 23/145 173/107 |
| 2004/0109742 A1* | 6/2004 | Kovac | F16B 19/02 411/353 |
| 2005/0269117 A1* | 12/2005 | Sato | B25D 17/11 173/132 |
| 2006/0201690 A1* | 9/2006 | Fehrle | B25F 5/02 173/170 |
| 2006/0225903 A1* | 10/2006 | Sterling | B25B 21/02 173/104 |
| 2006/0260141 A1* | 11/2006 | Phillips | B25F 5/02 30/392 |
| 2008/0224421 A1* | 9/2008 | Niblett | F16J 15/061 277/638 |
| 2010/0213234 A1* | 8/2010 | Ronn | B25C 1/047 227/130 |
| 2012/0138329 A1* | 6/2012 | Sun | B25F 5/02 173/221 |
| 2019/0152039 A1* | 5/2019 | Ikuta | B25D 17/11 |
| 2020/0131937 A1* | 4/2020 | Mancini | F01D 25/243 |
| 2020/0147776 A1* | 5/2020 | Kamiya | B25B 23/18 |

FOREIGN PATENT DOCUMENTS

| | | | |
|---|---|---|---|
| DE | 20317393 U | | 1/2004 |
| DE | 102017130363 | | 10/2019 |
| EP | 2910343 A2 | | 8/2015 |
| EP | 3302890 A1 | | 4/2018 |
| GB | 2478308 | | 9/2011 |
| JP | 2005106285 A | | 4/2005 |
| JP | 2006102926 A | * | 4/2006 |
| JP | 2006102926 A | | 4/2006 |
| WO | 9513166 A1 | | 5/1995 |
| WO | WO-2010020459 A1 | * | 2/2010 ............ B25F 5/008 |
| WO | 2011107492 | | 9/2011 |

OTHER PUBLICATIONS

Canadian Office Action for corresponding CA Application No. 3,120,305, dated Sep. 14, 2022, 4 pages.

Taiwan Office Action for corresponding TW Application No. 110119807, dated Sep. 20, 2022, 12 pages.

Australian Examination Report No. 2 for corresponding AU Applilcation No. 2021203215, dated Oct. 18, 2022, 3 pages.

United Kingdom Combined Search and Examination Report for corresponding UK Application No. GB2107100.6, dated Apr. 20, 2022, 9 pages.

Examination Report for corresponding Application No. GB2107100.6 dated Jan. 27, 2023, 6 pages.

* cited by examiner

INSERT FOR A POWER TOOL HOUSING

TECHNICAL FIELD OF THE INVENTION

The present invention relates generally to power tools for applying torque to a work piece. More particularly, the present invention relates to an insert that reduces creep and/or stress relaxation in a housing of a power tool.

BACKGROUND OF THE INVENTION

Many tools are powered by pneumatic air or hydraulic fluid. Impact wrenches, for example, can use pressurized air to impart torque to a work piece to loosen or tighten the work piece. These tools rely on a clamping force to ensure that the motor disposed in a housing does not leak fluid, such as, for example, air or hydraulic fluid. Fluid leaks negatively affect output power. Typically, the clamping force is created by coupling a housing and a nose housing using fasteners, such as screws. However, with the increased use of plastic components, including housings, the ability to maintain the necessary clamping force through the life of the tool is compromised due to the occurrence of creep and/or stress relaxation.

Existing pneumatic and hydraulic tools include ribs disposed on a rear portion of the housing to reduce and better distribute stress to prevent the occurrence of creep and/or stress relaxation. However, these ribs increase the dimensions and weight of the tool. Added weight and size negatively affects usability of power tools.

SUMMARY OF THE INVENTION

The present invention relates broadly to an insert, also referred to as a compression limiter, coupled to a housing and adapted to receive a fastener that couples to a nose housing. The insert provides sufficient area to contact a head of the fastener. The insert and nose housing are composed of a material that is less susceptible to creep and/or stress relaxation for the clamping force magnitudes commonly used. For example, the insert and nose housing can be composed of metal, and the housing can be composed of plastic.

In particular, the present invention broadly comprises a tool having a motor. The tool comprising a nose housing, a housing including an aperture adapted to receive a fastener that is adapted to apply a clamping force, an insert disposed within the aperture and having opposing first and second sides. The first side is adapted to be disposed proximal to a head of the fastener, and the second side is adapted to be disposed proximal to the motor.

In another embodiment, the present invention can further broadly comprise an insert adapted to be disposed in a housing aperture of a tool. The insert comprises first and second opposing sides, an insert aperture extending through the insert and that is adapted to receive a fastener, and an exterior surface corresponding to the housing aperture. The first side is adapted to be disposed proximal to a head of the fastener that applies a clamping force, and the second side is adapted to be disposed proximal to a motor of the tool.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
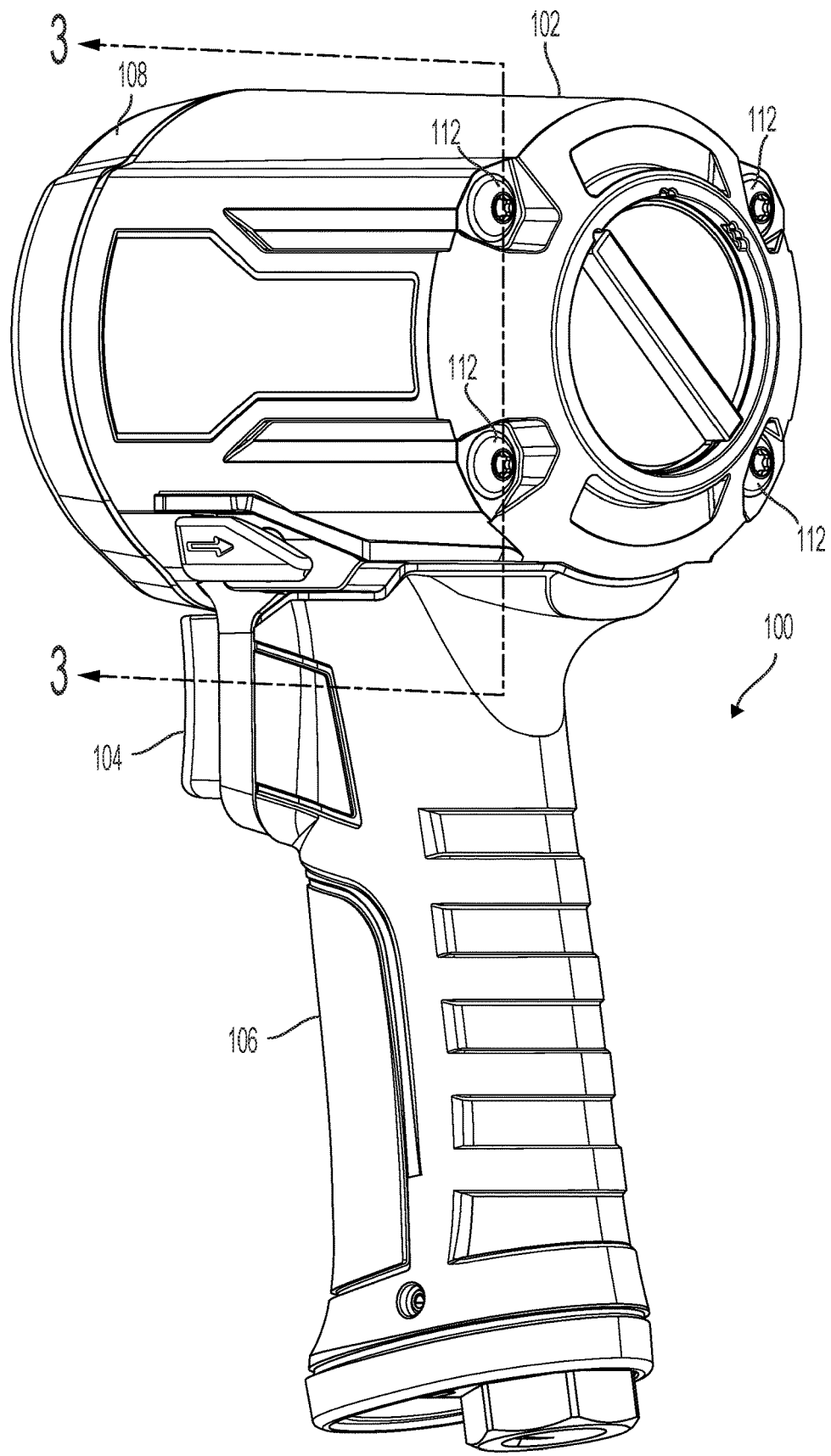
FIG. 1 is a perspective view of a tool incorporating an insert, according to an embodiment of the present invention.
Figure 2:
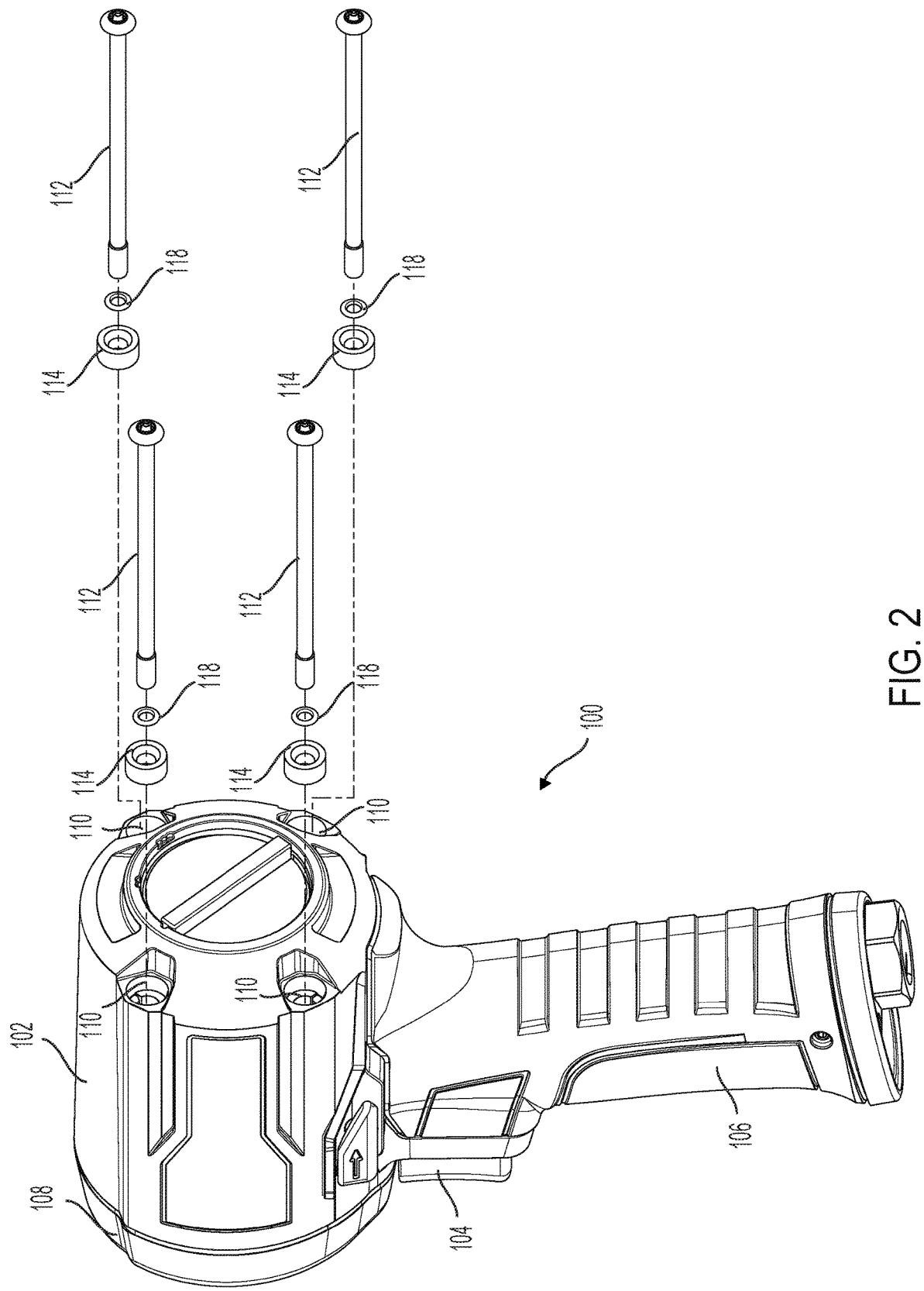
FIG. 2 is an exploded, disassembled perspective view of portions of the tool of FIG. 1.
Figure 3:
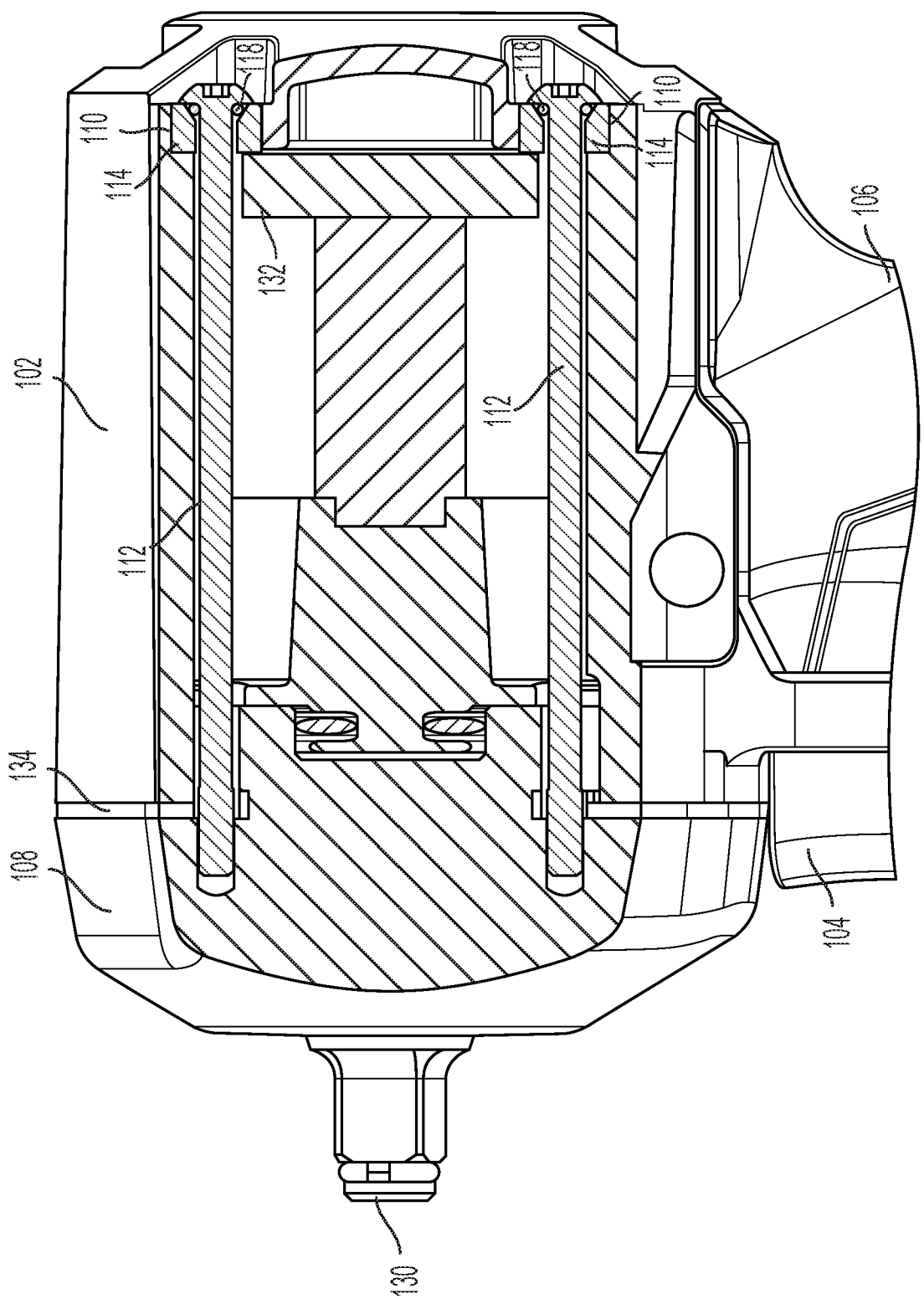
FIG. 3 is cross-sectional view of a housing of the tool of FIG. 1, along line 3-3 of FIG. 1.
Figure 4:
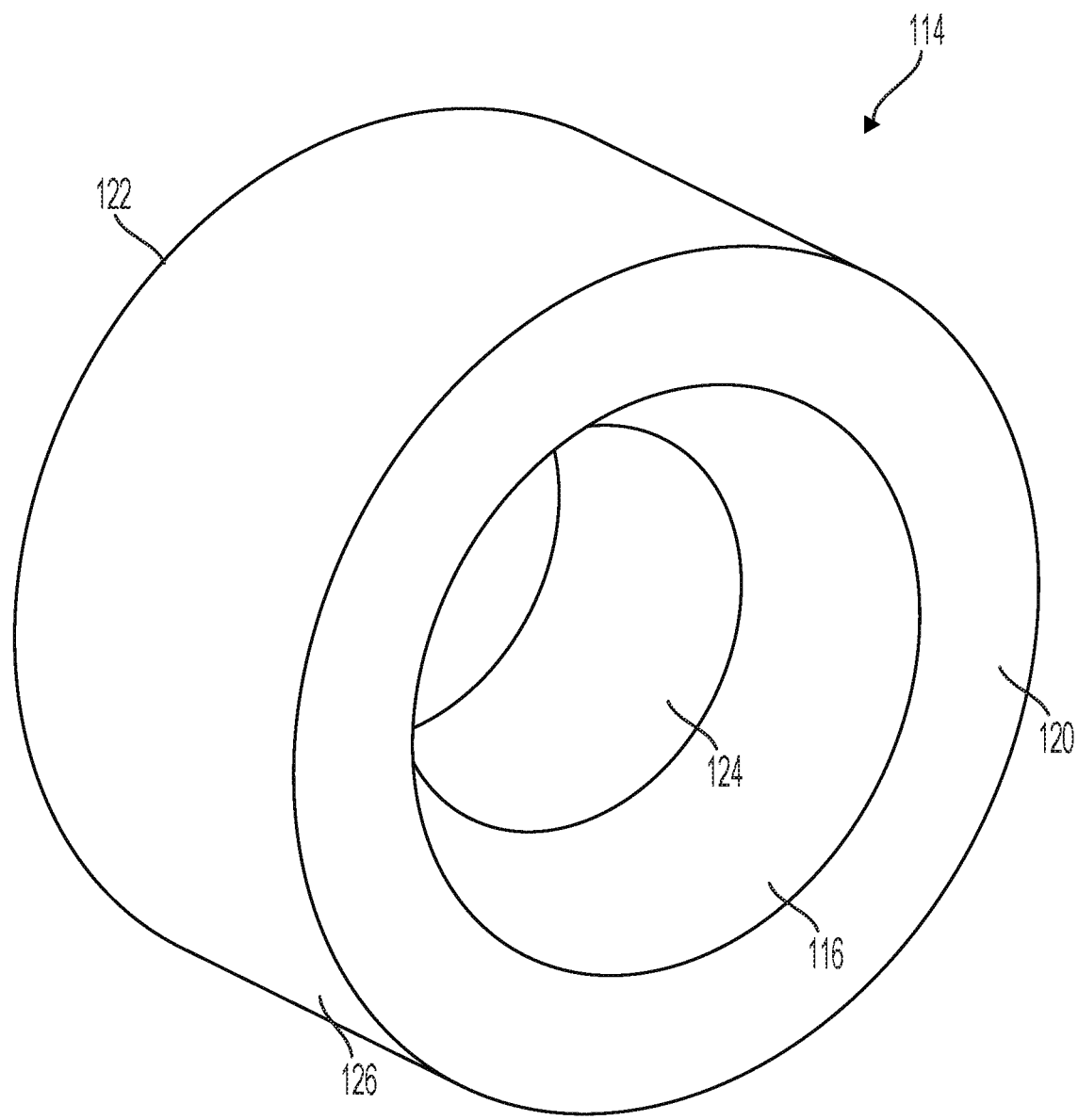
FIG. 4 is a perspective view of an insert, according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention broadly comprises an insert for a housing of power tool, such as, for example, a pneumatic or hydraulically powered impact wrench. The insert is disposed in the housing to contact a fastener used to apply a clamping force. The insert is composed of a material that resists creep and/or stress relaxation. This allows for the tool to maintain the clamping force applied by the fastener over the life of the tool, thereby reducing the possibility of fluid leaks.

Referring to FIGS. 1-5, a tool 100, such as a pneumatic or hydraulic impact wrench, includes a housing 102, a trigger 104 disposed adjacent to a handle 106 of the housing 102, and a nose housing 108 adapted to couple to an end of the housing 102. The trigger 104 can be actuated by a user to cause fluid, such as, for example, pressurized air or hydraulic fluid, from an external supply to operate the tool 100 to drive an output lug 130 in either one of first and second rotational directions (e.g., clockwise and counterclockwise). The output lug 130 can be coupled to other devices, such as a socket, to apply torque to a work piece, such as, for example, a screw or bolt, in a well-known manner. The trigger 104 can be biased such that the user can depress the trigger 104 inwardly, relative to the tool 100, to cause the tool 100 to operate, and release the trigger 104, wherein the biased nature of the trigger 104 causes the trigger 104 to move outwardly, relative to the tool 100, to cease operation of the tool 100.

The housing 102 is adapted to house a motor 132 and includes housing apertures 110 adapted to respectively allow fasteners 112 to pass therethrough. The fasteners 112 extend longitudinally through the housing 102 and are threadably coupled to the nose housing 108. In an embodiment, the housing 102 is composed of a plastic material. The housing 102 is coupled to the nose housing 108 via the fasteners 112. The fasteners 112 collectively apply a clamping force to restrict fluid, such as hydraulic fluid or air, from leaking through joints of the motor and/or an interface between the nose housing 108 and the housing 102. In an embodiment, a gasket 134 is disposed in the interface between the nose housing 108 and the housing 102.

Inserts 114 are disposed in the housing apertures 110 of the housing 102 and have first 120 and second 122 opposing sides and an insert aperture 124 sized to allow one of the fasteners 112 to pass therethrough. The inserts 114 can have a substantially circular cross-section as shown, although the invention is not limited to circular cross-sections and other suitable cross-sections may be used. The cross-section of the inserts 114 has sufficient area to contact a head of the fastener 112. For example, the first side 120 of the insert 114 is adapted to abut the head of one of the fasteners 114. The second side 122 of the insert 114 is adapted to abut the motor 132 (such as an end or other part of a casing of the motor 132), thereby transferring the clamping force from the fastener 114 to the motor 132 and removing the housing 102 from the load path of the clamping force. In an embodiment, the inserts 114 are bonded to the housing 102 by heat staking. Other suitable methods for bonding the inserts 114 to the housing 102 can be used. The inserts 114 are composed of a material that is resistant to creep and/or stress relaxation, such as, for example, a metal material. The nose housing 108 can also be composed of a material that is resistant to creep and/or stress relaxation, such as, for example, a metal material.

Figure 5:
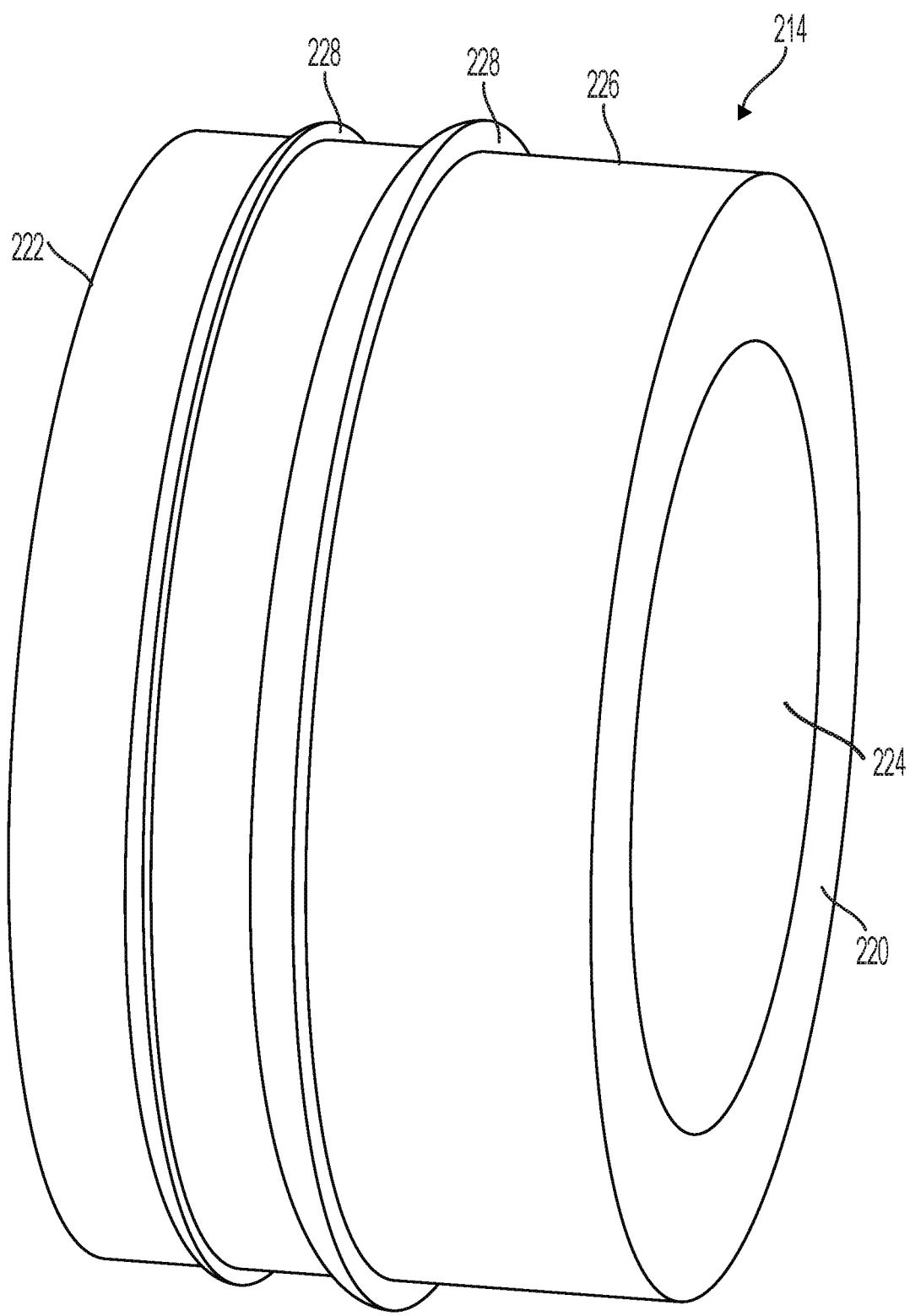
FIG. 5 is a perspective view of an insert, according to another embodiment of the present invention.

The inserts 114 include an exterior surface 126 that corresponds to an interior surface of the housing apertures 110. In an embodiment, the inserts 114 include a chamfer 116. The chamfer 116 provides a seat for a seal 118 that can be disposed between the head of the fastener 112 and the first side 120 of each of the inserts 114. In an embodiment, the seal 118 is an elastomeric O-ring. Referring to FIG. 5, in another embodiment, the insert 214 includes one or more barbs 228 disposed on the exterior surface 226. The barbs 220 respectively grip an interior surface of the housing apertures 110 and restrict the insert 214 from backing out of the housing aperture 110. The insert 214 may also include the chamfer 116.

By bonding inserts 114/214 into the housing 102, and disposing the motor 132 between the inserts 114/214 and the nose housing 108, the housing 102 can be removed from the load path of the clamping force applied by the fasteners 112. Therefore, the entire load path of the clamping force is through components composed of a material that is resistive to creep and/or stress relaxation, thereby reducing the possibility for fluid leaks to develop.

As discussed herein, the tool 100 can be a pneumatic tool such as an impact wrench. However, the tool 100 can be any pneumatically or hydraulically powered or hand-held tool, such as a ratchet wrench, torque wrench, impact wrench, drill, saw, hammer, or any other tool.

As used herein, the term "coupled" or "communicably coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool having a motor, the tool comprising:
a nose housing;
a housing including an aperture adapted to receive a fastener that is adapted to apply a clamping force to couple the nose housing to the housing;
an insert disposed within the aperture, the insert having opposing first and second sides, wherein the first side is adapted to be disposed proximal to a head of the fastener, and the second side is adapted to be disposed proximal to the motor.

2. The tool of claim 1, wherein the insert includes a chamfer at the first side.

3. The tool of claim 1, wherein each of the nose housing and the insert is composed of a material resistant to creep and stress relaxation.

4. The tool of claim 1, wherein each of the nose housing and the insert is composed of metal.

5. The tool of claim 1, wherein the housing is composed of plastic.

6. The tool of claim 1, wherein the fastener is threadably coupled to the nose housing.

7. The tool of claim 1, further comprising a seal disposed between the insert and the head of the fastener.

8. The tool of claim 7, wherein the seal is an O-ring.

9. The tool of claim 1, wherein the insert includes a barb disposed on an exterior surface of the insert.

10. An insert adapted to be disposed in a housing aperture of a housing of a tool, the insert comprising:
first and second opposing sides, wherein the first side is adapted to be disposed proximal to a head of a fastener that applies a clamping force to couple a nose housing to the housing, and the second side is adapted to be disposed proximal to a motor of the tool;
an insert aperture extending through the insert and that is adapted to receive the fastener; and
an exterior surface corresponding to the housing aperture.

11. The insert of claim 10, wherein the insert is bonded to the housing.

12. The insert of claim 10, wherein the first side of the insert includes a chamfer.

13. The insert of claim 10, further comprising a barb disposed on the exterior surface.

14. The insert of claim 10, wherein the insert has a substantially circular cross-section.

15. The insert of claim 10, wherein the insert is composed of a material resistant to creep and stress relaxation.

16. The insert of claim 10, wherein the insert is composed of a metal material.

* * * * *